(12) United States Patent
Scholefield et al.

(10) Patent No.: US 6,216,006 B1
(45) Date of Patent: Apr. 10, 2001

(54) METHOD FOR AN ADMISSION CONTROL FUNCTION FOR A WIRELESS DATA NETWORK

(75) Inventors: Christopher Scholefield, Delta; Theodore Ono-Tesfaye, Edmonton, both of (CA)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 08/961,854

(22) Filed: Oct. 31, 1997

(51) Int. Cl.$^7$ ........................................... H04Q 7/20
(52) U.S. Cl. ..................... 455/450; 455/422; 455/453
(58) Field of Search ................... 455/62, 422, 450–453, 455/464, 509; 370/230, 232, 234, 229, 241, 249, 468

(56) References Cited

U.S. PATENT DOCUMENTS

| | | | |
|---|---|---|---|
| 5,379,448 | * 1/1995 | Ames et al. | 455/453 |
| 5,625,879 | * 4/1997 | Tuulos | 455/62 |
| 5,633,859 | * 5/1997 | Jain et al. | 370/234 |
| 5,673,259 | * 9/1997 | Quick, Jr. | 370/349 |
| 5,701,295 | * 12/1997 | Bales et al. | 455/468 |
| 5,729,531 | * 3/1998 | Raith et al. | 455/453 |
| 5,794,140 | * 8/1998 | Sawyer | 455/453 |

\* cited by examiner

*Primary Examiner*—Nay Maung
(74) *Attorney, Agent, or Firm*—Mario J. Donato, Jr.

(57) ABSTRACT

A method for allowing new traffic on a wireless data network. A service request is received from a mobile station (100). An effective bandwidth of the service request is estimated (110) using a recursive estimator (400). If there is enough surplus capacity on the wireless data network to accommodate the service request, the service request is granted. In response, a discrete adjustment, based on the effective bandwidth, is applied (160) to the recursive estimator (400).

10 Claims, 4 Drawing Sheets

METHOD FOR AN ADMISSION CONTROL FUNCTION FOR A WIRELESS DATA NETWORK

FIELD OF THE INVENTION

The present invention relates generally to admission control function for a wireless data network.

BACKGROUND OF THE INVENTION

Wireless data networks aim to provide users with guaranteed quality of service (QoS) levels while allowing network operators to exploit the statistical multiplexing gain associated with the fact that there are many users sharing multiple resources (i.e., the users not having those multiple resources solely dedicated to their individual requirements). This is in part due to the fact that the resource requirements of N multiplexed users, which may be bursty in nature, are less than the sum of the individual resource requirements for each user.

QoS guarantees require some kind of resource allocation. Following the conventional vocabulary, the period during which the resources, which are typically real circuits and switches, are allocated is referred to as a physical connection for a duration of a real circuit. When using statistical multiplexing, in contrast to the conventional vocabulary, the period during which the pool of shared resources are reserved is referred to as a "context" (i.e., logical connection) for a duration of a virtual circuit. In a wireless data network, this "context" begins with the activation of a packet data protocol virtual circuit (i.e., carrying packets from different external networks) and ends with the deactivation of the packet data protocol virtual circuit. This should not be confused with the fact that in a wireless data network there are both connection-oriented and connection-less services offered to applications. For instance, even if an application uses the internet protocol-type connection-less services of a wireless data network, there is a logical connection between the network layers in the mobile station and the base station. It is at this level that the admission control function operates. The admission control function of a wireless data network decides for each incoming virtual circuit request whether a sufficient aggregate pool of shared resources are available to satisfy the virtual circuit QoS requirements. The resources are dedicated to a particular virtual circuit only as they are actually needed to effect a data transfer and only for the duration of the transfer.

To perform resource allocation, the admission control function must be able to determine the load on each element of the network as well as its own network sub-systems. This includes but is not limited to any external network such as a packet data network, public switched telephone network, wireless data network, or neighboring public land mobile network, as well as its own network sub-system and base station sub-system. The admission control function is the central measurement consolidation and decision point for admitting new service requests to the network. This function could be placed at any node in the network such as the general packet radio service (GPRS) support node, the base station, the network management center or the mobile switching center to name a few.

In general, the load on a particular element of the network can be determined in two ways: (1) by looking at the accumulation of the previously granted service requests; and (2) by measuring the real load on the network. Measurement of the network load is usually performed by a network node such as a general support node or base station. Unfortunately, there are problems with determining the load on the networks, such as, responsiveness to load fluctuations and accuracy of accumulating service requests.

Measurement-based approaches particularly suffer from the following problem. With these methods there is a time delay during which the measurement must adjust to new traffic (i.e., service requests) that has been recently admitted to the network. During this period, the network can receive a new service request and grant this request believing that the wireless data network has enough surplus capacity to support the request. In fact, however, the wireless data network may not have enough surplus capacity because of the time delay associated with the measurement adapting to the previously admitted service request.

Admission control functions for the provision of the QoS have been investigated in Asynchronous Transfer Mode (ATM) networks. These ATM networks operate at very high speed (typically above 150 Mbps) and over reliable wired or optical fiber links. With such a high transmission speed, the admission control function can be non-optimal by being conservative in resource allocation and reserving more bandwidth than is minimally necessary to achieve the QoS. ATM networks normally carry a mixture of QoS classes including constant bit rate and variable bit rate with fixed delay. These classes are intended for use to transmit voice or video in which the delay is more important than the reliability of delivery (i.e., if the data is delayed then the data may be discarded rather than reliably delivering it). In contrast, wireless data networks have relatively low transmission speeds, typically below 200 Kbps, which must be highly optimized. In addition, data reliability is normally more important in wireless data networks than the delay. Robust transmission link methods such as forward error correction and automatic repeat request are necessary to achieve data integrity over the wireless data link which may be subjected to high levels of interference.

In conclusion, the existing admission control functions do not sufficiently satisfy the needs for efficient resource reservation in wireless data networks. Thus, there exists a need to improve the admission control function algorithms for networks in general, and in hybrid networks in particular, which may include wireless components which might exhibit limited bandwidth capacity or unreliability due to high levels of interference.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

In networks in general, and in wireless data networks in particular, resources must be reserved in order to provide users with guaranteed quality of service (QoS) levels. As stated previously, the admission control function of a wireless data network decides for an incoming service request whether enough resources are available to satisfy the QoS requirement of an incoming service request. The present invention provides a method of determining whether additional service requests (i.e., traffic) can be admitted on the wireless data network while maintaining quality of service levels across the network and, as a consequence, to each user on the network.

Figure 1:
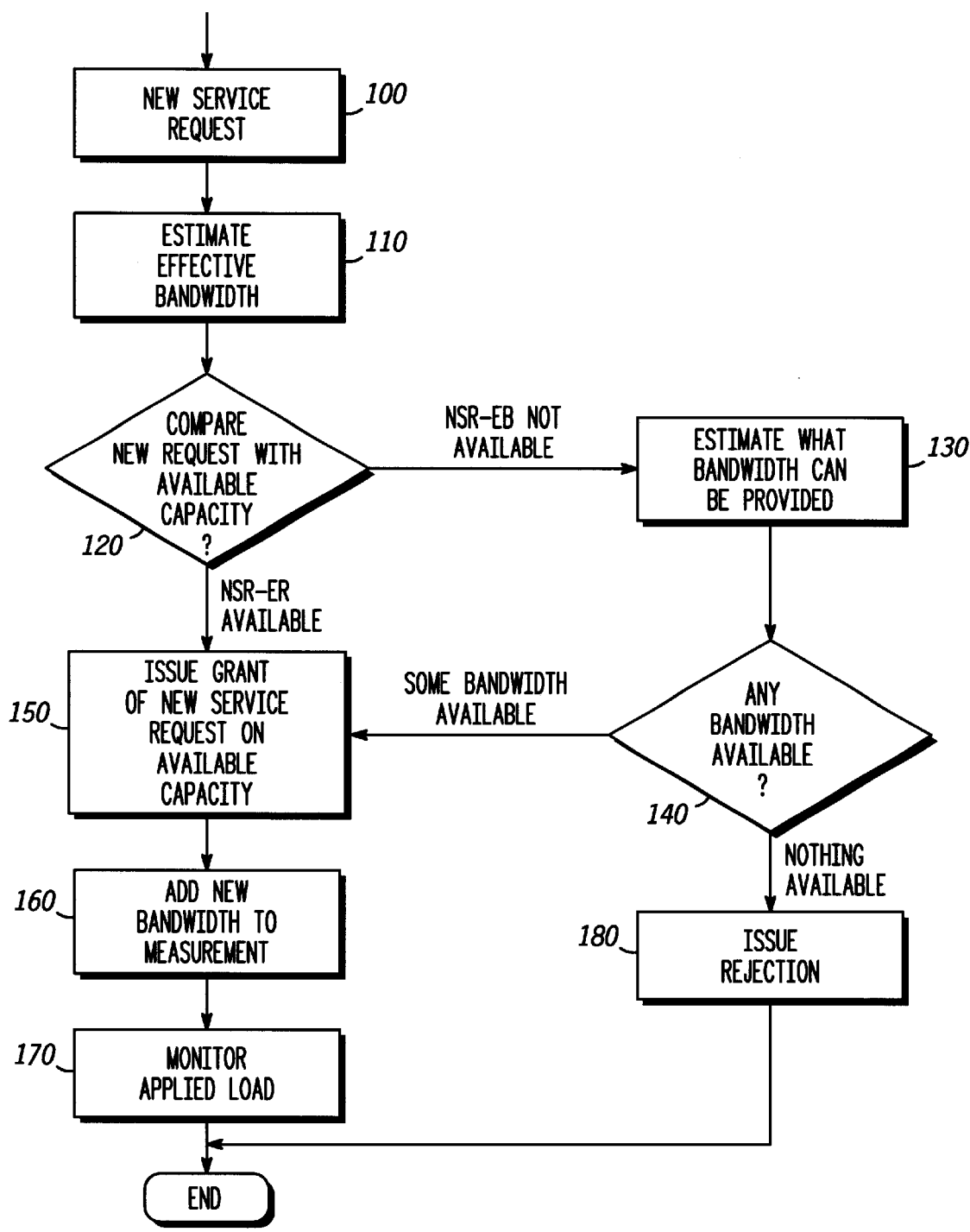
FIG. 1 is a flow chart for allowing new traffic on a wireless data network according to the present invention.

Referring to the drawings, FIG. 1 is a flow chart for allowing new traffic (i.e., service requests) on a wireless data network according to the present invention. Before sending any data, the admission control function is initiated by a service request from a mobile station which is sent to a base station at step 100. In this service request, the mobile station must specify the QoS with traffic descriptors such as the mean bit rate, the peak bit rate and the requested delay. There are other parameters such as burst size, burst duration, and duty cycles which also may be used depending on the particular method chosen to describe the service requests.

Figure 2:
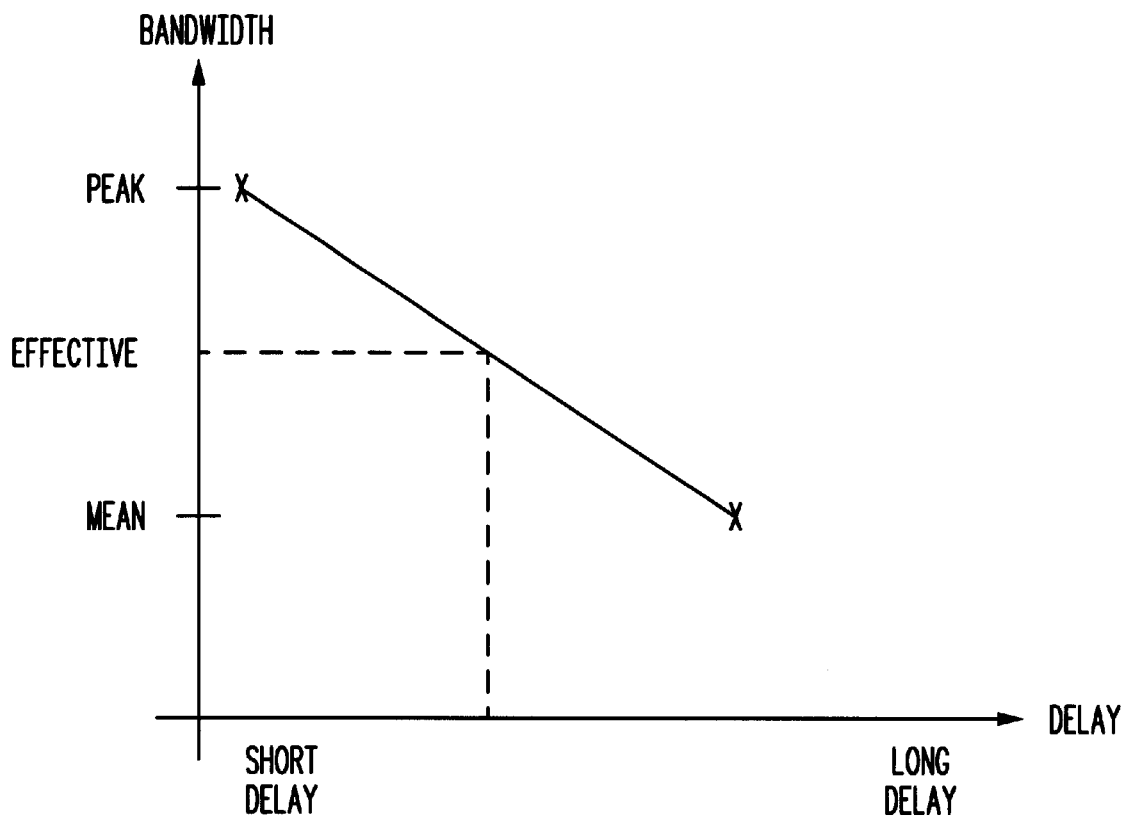
FIG. 2 is a graph representing bandwidth utilization under different delay constraints according to the present invention.

The effective bandwidth of the new service request is estimated using the QoS parameters at step 110. FIG. 2 is a graph representing bandwidth utilization under different delay constraints according to the present invention. As shown in FIG. 2, the effective bandwidth is the amount of bandwidth that has to be reserved in order to meet the QoS requirements. This value is between the mean bit rate and the peak bit rate. The actual value depends on what delay the user desires from the wireless data network. The delay requirements of each service request corresponds to a class of service which indicates the amount of delay that can be tolerated by the user. For example, as shown below in Table 1, a GPRS class 1 service request can tolerate a mean packet data unit delay of 0.5 s. A request for low delay requires a greater weight applied to the peak estimate. It is found that a simple estimate of effective bandwidth is a weighted sum of the mean and peak bit rates, where the weights are fixed and predetermined for the delay class of service. The weight values may be implemented in the form of a simple lookup table for the delay class.

TABLE 1

GPRS QoS classes and mean packet data unit delay requirements.

| Class | Mean (128 octets) | 95%-tile | Mean (1024 octets) | 95%-tile |
|---|---|---|---|---|
| 1 | 0.5 s | 1.5 s | 2 s | 7 s |
| 2 | 5 s | 25 s | 15 s | 75 s |
| 3 | 50 s | 250 s | 75 s | 375 s |

Returning back to FIG. 1, once the effective bandwidth of the new service request is estimated at step 110, the admission decision is made at step 120. The admission decision is determined by testing whether there is enough surplus capacity on the wireless data network to accommodate the effective bandwidth of the service request.

Figure 3:
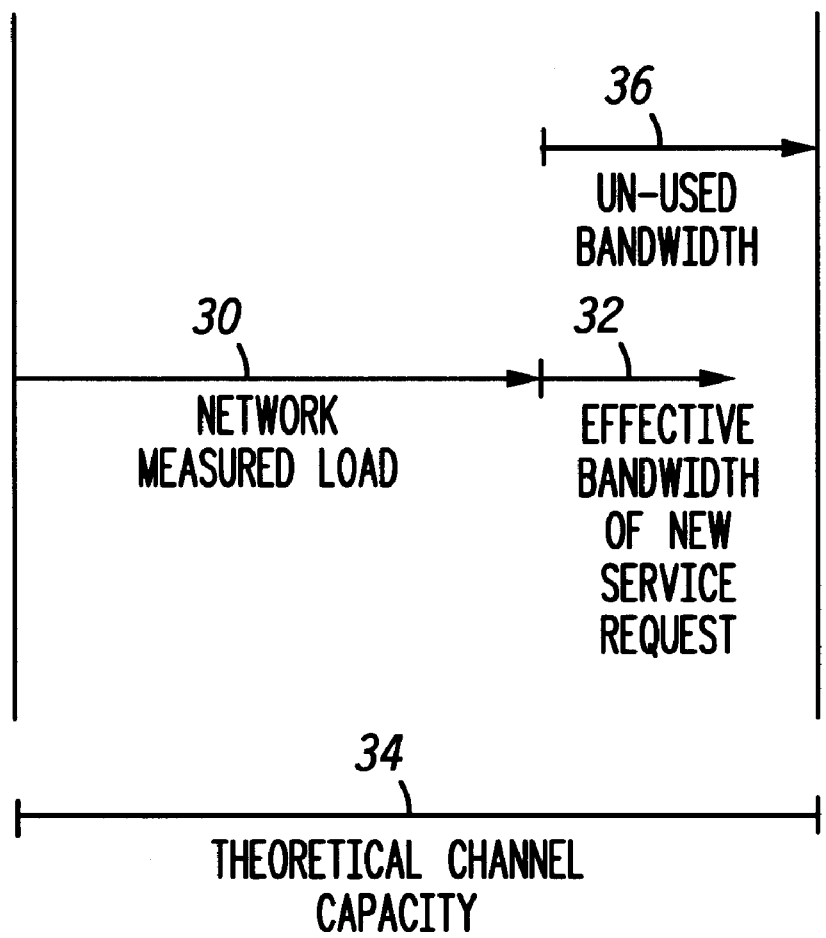
FIG. 3 is a diagram representing theoretical channel capacity according to the present invention.

FIG. 3 is a diagram representing theoretical channel capacity according to the present invention. As shown in FIG. 3, one of the unique attributes of the present invention is the use of a combination of the measured load on the network 10 and the effective bandwidth of the new service request 12 using a recursive estimator (discussed in detail with respect to FIG. 4) with discrete adjustments by the admitted traffic load (i.e., effective bandwidth of the new service request 12) to provide an optimal estimate of the measured load on the network. The surplus capacity (unused bandwidth) 36 is found from the theoretical channel capacity 34 minus the current wireless data network load estimate 30 of effective bandwidth. Wireless data network load estimates 30 are determined from measured load samples, using a filtering method in the form of the recursive estimator.

Figure 4:
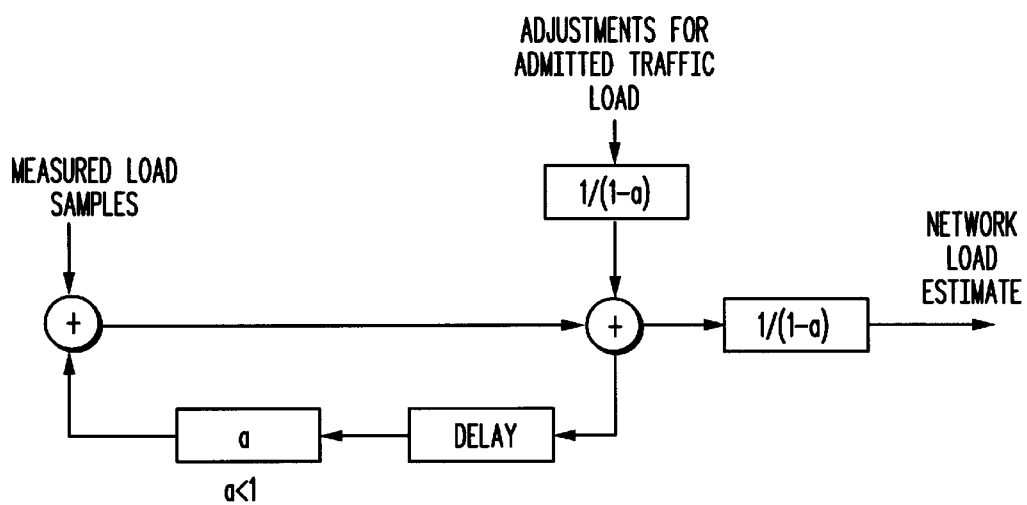
FIG. 4 is a block diagram of a recursive estimator according to the present invention.

FIG. 4 is a block diagram of the recursive estimator according to the present invention. The recursive estimator 400 has the effect of filtering the load samples with a greater weight being applied to more recent samples, and it is possible to add occasional corrections whenever a jump in the load is expected (i.e., when a new call is admitted or a call is terminated). The algorithm is as follows:

the recursive estimator 400 is used to estimate the current used/unused bandwidth; add/subtract the mean rate as a correction whenever a call is admitted or terminated;

the bandwidth requirement of new calls is estimated as a weighted sum of peak and mean rates;

calls are admitted if the bandwidth requirement of the new call is less than the estimated unused bandwidth.

The parameter "a" in the recursive estimator 400 is called the filter gain and in the preferred embodiment it controls the ability of the recursive estimator 400 to respond to traffic load fluctuations. The parameter "a" has to be set according to the prevailing system conditions. Values closer to 1 make the recursive estimator 400 more sluggish (but less prone to random fluctuations), whereas smaller values make the recursive estimator 400 react more quickly to network changes. The value of the parameter must be constrained to be between 0 and 1. Because of the possibility of adding corrections to the estimate, the recursive estimator 400 is extremely advantageous during periods when the number of connections change rapidly (e.g., during network startup).

Returning to FIG. 1, when sufficient surplus capacity is available, the admission control function issues an admission grant to the mobile station as shown in step 150. In response, a discrete adjustment of the new bandwidth (i.e., the effective bandwidth of the new service request) is applied to the recursive estimator 400 at step 160. In this way, the load estimate is instantaneously adjusted by the recursive estimator 400 by the level of the effective bandwidth of the new service request. This is done to avoid further service requests from being granted before the recursive estimator 400 has reached a steady state condition with the newly admitted traffic (i.e., the new service request). In the final step, the load on the wireless data network is monitored at step 170 using the recursive estimator 400, so that any deviation from the effective bandwidth of the new service request and the actual admitted traffic is eliminated.

When sufficient surplus capacity is not available at step 120, the admission control function estimates the bandwidth that is available and estimates what can be provided at step 130. Step 140 determines if there is any bandwidth available. If there is bandwidth available, the admission control function issues a grant at step 150 indicating the amount of bandwidth which the service request may use. If there is no bandwidth available at step 140, step 180 is taken and the admission control function rejects the service request and notifies the mobile station of the rejection. On receipt of the rejection, the mobile station may modify the request and submit a new service request if a lower peak, mean data rate or longer delay can be tolerated. If this is the case, the mobile station initiates a new request and the entire procedure is started over again.

In the preferred embodiment, a hybrid admission control function algorithm is used in determining whether to admit new traffic. The hybrid algorithm has three internal control parameters: (1) the filter gain; (2) the averaging interval for the delay monitoring; and (3) a normalized threshold of delay. These parameters are internal to the network only and can be set according to the prevailing traffic conditions. These parameters are for control of the admission control function algorithm only and are not exchanged between the mobile station and the network. The hybrid admission control function algorithm uses a combination of the measured load on the network and delay monitoring. The hybrid technique accepts a service request only if both criteria are acceptable. The measured load on the network is described above with respect to FIGS. 1 through 2. Delay monitoring estimates the normalized packet delay directly, rather than relying on indirect congestion indicators like the measured load on the wireless data network. The normalized delay is derived from the ratio of measured delay and requested QoS. Thus, delay monitoring can detect situations where QoS requirements are not met even though the load on the wireless data network is relatively low. The delay monitoring algorithm is as follows:

keep an estimate of the average of the last normalized network layer PDU delays incurred in each QoS class; and admit the new service request as long as the estimated delays are less than a threshold in all QoS classes.

In the hybrid technique, the quality of service parameters are delay and bit rate. The delay is a mean packet data unit delay that the mobile station experiences when transporting packets through the wireless data network. Each service request corresponds to a class of service which indicates the amount of delay that can be tolerated by the service request. The bit rate is a transmission rate of a packet data unit through the wireless data network. Thus, in the hybrid technique, the admission control function determines whether there is enough surplus capacity on the wireless data network to accommodate the service request and determines whether a mean packet data unit delay in the wireless data network is less than a specified delay indicated from the QoS parameters in the service request. If both of the criteria are satisfied, then the service request is granted.

Various alterations, modifications and variations will be apparent to those skilled in the art in light of the foregoing description. While the invention has been described in conjunction with specific embodiments thereof. The invention, in its broader aspects, is therefore not limited to the specific details, representative apparatus and illustrative examples shown and described. Thus, it should be understood that the invention is not limited by the foregoing description, but embraces all such alterations, modifications and variations in accordance with the spirit and scope of the appended claims.

We claim:

1. A method for admitting new service requests having quality of service requirements on a wireless data network having quality of service parameters comprising:

receiving a service request having quality of service requirements from a mobile station;

estimating a load on the wireless data network using a recursive estimator to provide a load estimate;

determining an effective bandwidth of the service request;

determining that the quality of service parameters of the wireless data network satisfy the quality of service requirements of the service request;

granting the service request;

applying a discrete adjustment, based on the effective bandwidth of the service request, to the load estimate using the recursive estimator; and monitoring the load on the wireless data network using the recursive estimator so that a deviation from the effective bandwidth of the service request and the admitted new service is eliminated.

2. The method of claim 1 wherein the quality of service parameters are based on a delay.

3. The method of claim 2 wherein the delay is a mean packet data unit delay that the mobile station experiences when transporting packets through the wireless data network.

4. The method of claim 1 wherein the quality of service parameters are based on a bit rate.

5. The method of claim 4 wherein the bit rate is a transmission rate of a packet data unit through the wireless data network.

6. The method of claim 1 wherein the quality of service parameters are based on a delay and a bit rate.

7. The method of claim 6 wherein the delay is a mean packet data unit delay that the mobile station experiences when transporting packets through the wireless data network and the bit rate is a transmission rate of a packet data unit through the wireless data network.

8. The method of claim 1 wherein the quality of service requirements of each service request correspond to a class of service which indicates an amount of delay that can be tolerated by the service request.

9. The method of claim 8 wherein the step of determining comprises determining that there is enough surplus capacity on the wireless data network to accommodate the service request and determining that a mean packet data unit delay in the wireless data network is less than a specified delay indicated from the class of service of the service request.

10. An apparatus for allowing new traffic on a wireless data network comprising:

a receiver to receive a service request from a mobile station having an effective bandwidth;

a transmitter to transmit an admission grant to the mobile station; and a recursive estimator to provide a load estimate which is an estimate of a load on the wireless data network and, responsive to the admission grant, to make an adjustment to the load estimate based on the effective bandwidth of the service request, said recursive estimator further adapted to monitor the load on the wireless data network so that a deviation from the effective bandwidth of the service request and the admitted new service is eliminated.

* * * * *